(12) United States Patent
Yamamoto

(10) Patent No.: US 8,335,139 B2
(45) Date of Patent: Dec. 18, 2012

(54) CONTROL DEVICE, CONTROL METHOD, AND CONTROL PROGRAM

(75) Inventor: Masaaki Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 22 days.

(21) Appl. No.: 13/154,958

(22) Filed: Jun. 7, 2011

(65) Prior Publication Data

US 2012/0002522 A1      Jan. 5, 2012

(30) Foreign Application Priority Data

Jun. 30, 2010   (JP) ................................ 2010-149582

(51) Int. Cl.
*G11B 7/00* (2006.01)
(52) U.S. Cl. ................... 369/47.51; 369/116; 369/53.26
(58) Field of Classification Search ...... 369/47.5–47.53, 369/116, 59.11, 53.26
See application file for complete search history.

(56) References Cited

U.S. PATENT DOCUMENTS

| | | | |
|---|---|---|---|
| 5,126,994 A | | 6/1992 | Ogawa et al. |
| 5,216,660 A | | 6/1993 | Iimura |
| 5,495,463 A | * | 2/1996 | Akagi et al. ................. 369/116 |
| 7,872,956 B2 | * | 1/2011 | Eguchi et al. ............. 369/47.53 |
| 2002/0031066 A1 | * | 3/2002 | Okumura et al. ............ 369/47.5 |
| 2002/0172242 A1 | * | 11/2002 | Seo ........................... 372/29.02 |
| 2003/0185123 A1 | * | 10/2003 | Sato .......................... 369/59.11 |
| 2005/0058053 A1 | * | 3/2005 | Ueno et al. .................... 369/116 |
| 2005/0128910 A1 | * | 6/2005 | Lin et al. .................... 369/47.53 |
| 2006/0278822 A1 | * | 12/2006 | Park ........................... 250/252.1 |
| 2009/0073846 A1 | * | 3/2009 | Tsukahara et al. ........... 369/100 |
| 2010/0091638 A1 | * | 4/2010 | Yamamoto et al. ........ 369/124.1 |
| 2010/0315921 A1 | * | 12/2010 | Kishigami ................ 369/47.53 |
| 2011/0007617 A1 | * | 1/2011 | Tachino et al. .............. 369/53.2 |

FOREIGN PATENT DOCUMENTS

| | | |
|---|---|---|
| JP | 4-10237 | 1/1992 |
| JP | 6-76288 | 3/1994 |
| JP | 2764965 | 4/1998 |

* cited by examiner

*Primary Examiner* — Thang Tran
(74) *Attorney, Agent, or Firm* — Oblon, Spivak, McClelland, Maier & Neustadt, L.L.P.

(57) ABSTRACT

There is provided a control device including a recording portion that records data on a disk by shining a laser beam onto a recording surface of the disk, a reading portion that reads the data on the disk, a control parameter computation portion that computes a control parameter, a differential computation portion that computes a differential between the control parameter and a value that is set in advance for the disk, a determination portion that determines whether the differential that the differential computation portion has computed is within a range of a dead band, an output value computation portion that computes an output value for the laser beam, an output control portion that controls the laser beam, a storage portion that stores a plurality of combinations of the dead band and the gain, and a selecting portion that selects one of the combinations of the dead band and the gain.

7 Claims, 8 Drawing Sheets

FIG.5

|  | DEAD BAND (Δβ) | gain | REMARKS |
|---|---|---|---|
| Item0 | 0.02 | 1 |  |
| Item1 | 0.015 | 0.5 | CONTROL OBJECT 1 |
| Item2 | 0.013 | 0.04 | CONTROL OBJECT 2 |
| Item3 | 0.012 | 0.03 | CONTROL OBJECT 3 |

FIG.7

| DBSum | | 0.019 | 0.018 | 0.017 | 0.016 | DEAD BAND 0.015 | 0.014 | 0.013 | 0.012 | 0.011 | 0.01 |
|---|---|---|---|---|---|---|---|---|---|---|---|
| | 0.8 | 0.000107 | 0.000106 | 0.000106 | 0.000106 | 0.000106 | 0.000106 | 0.000107 | 0.000108 | 0.000109 | 0.00011 |
| | 0.7 | 0.000104 | 0.000103 | 0.000102 | 0.000103 | 0.000102 | 0.000101 | 0.000104 | 0.000106 | 0.000108 | 0.000109 |
| | 0.6 | 0.000102 | 0.000101 | 0.000102 | 0.000101 | 9.95E-05 | 9.72E-05 | 0.000103 | 0.000104 | 0.000106 | 0.000106 |
| | 0.5 | 0.000101 | 0.000102 | 0.000101 | 9.78E-05 | 9.78E-05 | 9.69E-05 | 0.000101 | 0.000105 | 0.000107 | 0.000106 |
| Gain | 0.4 | 0.000102 | 0.000104 | 0.000103 | 0.0001 | 9.91E-05 | 0.0001 | 0.0001 | 0.000106 | 0.000108 | 0.000104 |
| | 0.3 | 0.000114 | 0.000106 | 0.000105 | 0.000105 | 0.000101 | 0.000103 | 0.0001 | 0.000106 | 0.00011 | 0.000104 |
| | 0.2 | 0.000123 | 0.000126 | 0.000126 | 0.000108 | 0.000112 | 0.000108 | 0.000104 | 0.000109 | 0.000107 | 0.000103 |
| | 0.1 | 0.000139 | 0.000133 | 0.000133 | 0.000123 | 0.000135 | 0.000122 | 0.000115 | 0.00011 | 0.000106 | 0.00011 |

CONTROL DEVICE, CONTROL METHOD, AND CONTROL PROGRAM

BACKGROUND

The present disclosure relates to a control device, a control method, and a control program.

Recording and playback devices that use optical disks as recording media are widely used, and the optical disks that are used include read-only disks, write-once disks, rewriteable disks, and the like.

The read-only disk may be, for example, a ROM type disk in which information is recorded in the form of embossed bits. The write-once disk is a disk that uses a dye change film in its recording layer and that records information by using a laser to form dye change pits (marks). Information can be written to it only once. The rewriteable disk is a disk that uses a phase change film in its recording layer and that records information by using a laser to form phase change pits (marks). Information can be rewritten to it. The various types of disks are used for various types of uses, according to their respective characteristics.

Incidentally, performing laser output control during recording is effective in recording devices for the write-once disk and the rewriteable disk. This technology is also known as Optimum Power Calibration (OPC).

OPC is particularly effective with respect to unevenness in the manufacture of the disk (unevenness in the recording layer), a skewed state (tilting of the optical disk in relation to the optical axis), and the like. For example, during recording, the shape of the laser spot and the distribution of energy within the spot vary due to the manufactured unevenness in the recording layer and the skewed state, causing variation in the pit formation performance. It is therefore desirable to adjust the laser output during recording in accordance with these factors, such that the pit formation performance can be maintained. For example, OPC technologies are disclosed in Japanese Patent Specification 2764965, Japanese Patent Application Publication No. JP-A-4-10237, and Japanese Patent Application Publication No. JP-A-6-76288.

SUMMARY

Incidentally, in the OPC that is performed during recording, a $\beta$ value is computed as a control parameter for the laser output control, based on a radio frequency signal. A differential $\Delta\beta$ is computed between the computed $\beta$ value for the individual disk and a target $\beta$ value that is set in advance. When the computed differential $\Delta\beta$ is within a range of a specified dead band, the laser output is adjusted by using a specified gain to compute a laser output value.

However, unevenness in the sensitivity of the disk occurs due to factors such as the manufacturer, the stamper, the material, the manufacturing lot, and the like, such that some disks have great unevenness in their sensitivity and other disks have very little. Therefore, depending on the disk, an issue can occur in that the recording characteristics become poor, because the $\beta$ value that serves as the control parameter does not converge toward the target $\beta$ value.

Accordingly, in light of the issue described above, the present disclosure provides a control device, a control method, and a control program that are novel and improved and that are capable of improving the recording characteristics during recording on the disk.

According to an embodiment of the present disclosure, there is provided a control device including a recording portion that records data on a disk by shining a laser beam onto a recording surface of the disk, a reading portion that reads the data that the recording portion has recorded on the disk, a control parameter computation portion that computes a control parameter based on a signal that is generated by the reading of the data by the reading portion, a differential computation portion that computes a differential between the control parameter that the control parameter computation portion has computed and a value that is set in advance for the disk, a determination portion that determines whether the differential that the differential computation portion has computed is within a range of a dead band, an output value computation portion that, in a case where the result of the determination by the determination portion is that the differential is not within the range of the dead band, computes, using a gain that is associated with the dead band, an output value for the laser beam that the recording portion will shine next onto the recording surface of the disk, an output control portion that, based on the laser beam output value that the output value computation portion has computed, controls the laser beam that the recording portion will shine next onto the recording surface of the disk, a storage portion that stores a plurality of combinations of the dead band and the gain, and a selecting portion that selects, from among the plurality of the combinations of the dead band and the gain, one of the combinations of the dead band and the gain that the determination portion and the output value computation portion will use.

The selecting portion, in a case where the result of the determination by the determination portion is that the differential is within the range of the dead band, may select, as the combination of the dead band and the gain that the determination portion and the output value computation portion will use, one of the combinations of the dead band and the gain in which the range of the dead band is narrower than the range of the current dead band.

The value of the gain that the selecting portion has selected and that the determination portion and the output value computation portion will use next may be less than the value of the immediately preceding gain that the determination portion and the output value computation portion used.

The selecting portion, in a case where the result of the determination by the determination portion is that the differential is not within the range of the dead band, may select, as the combination of the dead band and the gain that the determination portion and the output value computation portion will use, one of the combinations of the dead band and the gain in which the range of the dead band is wider than the range of the current dead band.

The value of the gain that the selecting portion has selected and that the determination portion and the output value computation portion will use next may be greater than the value of the immediately preceding gain that the determination portion and the output value computation portion used.

According to another embodiment of the present disclosure, there is provided a control method including recording data on a disk by shining a laser beam onto a recording surface of the disk, reading the data that have been recorded on the disk, computing a control parameter based on a signal that is generated by the reading of the data, computing a differential between the computed control parameter and a value that is set in advance for the disk, determining whether the computed differential is within a range of a dead band, computing, using a gain that is associated with the dead band, an output value for the laser beam that will be shone next onto the recording surface of the disk, in a case where it has been determined that the differential is not within the range of the dead band, controlling the laser beam that will be shone next onto the recording surface of the disk, based on the computed laser beam output value, storing a plurality of combinations of the dead band and the gain, and selecting, from among the stored plurality of the combinations of the dead band and the gain, one of the combinations of the dead band and the gain that will be used for determining whether the computed differential is within the range of the dead band and for computing the output value for the laser beam.

According to another embodiment of the present disclosure, there is provided a control program that causes a computer to function as a recording portion that records data on a disk by shining a laser beam onto a recording surface of the disk, a reading portion that reads the data that the recording portion has recorded on the disk, a control parameter computation portion that computes a control parameter based on a signal that is generated by the reading of the data by the reading portion, a differential computation portion that computes a differential between the control parameter that the control parameter computation portion has computed and a value that is set in advance for the disk, a determination portion that determines whether the differential that the differential computation portion has computed is within a range of a dead band, an output value computation portion that, in a case where the result of the determination by the determination portion is that the differential is not within the range of the dead band, computes, using a gain that is associated with the dead band, an output value for the laser beam that the recording portion will shine next onto the recording surface of the disk, an output control portion that, based on the laser beam output value that the output value computation portion has computed, controls the laser beam that the recording portion will shine next onto the recording surface of the disk, a storage portion that stores a plurality of combinations of the dead band and the gain, and a selecting portion that selects, from among the plurality of the combinations of the dead band and the gain, one of the combinations of the dead band and the gain that the determination portion and the output value computation portion will use.

According to the present disclosure that has been explained above, it is possible to improve the recording characteristics during recording on the disk.

BRIEF DESCRIPTION OF THE DRAWINGS

FIG. 5 is an explanatory figure for explaining an example of an item that is stored by the recording and playback device in FIG. 1;

FIG. 7 is an explanatory figure for explaining examples of a dead band, a gain, and a DBSum.

DETAILED DESCRIPTION OF EMBODIMENT

Figure 1:
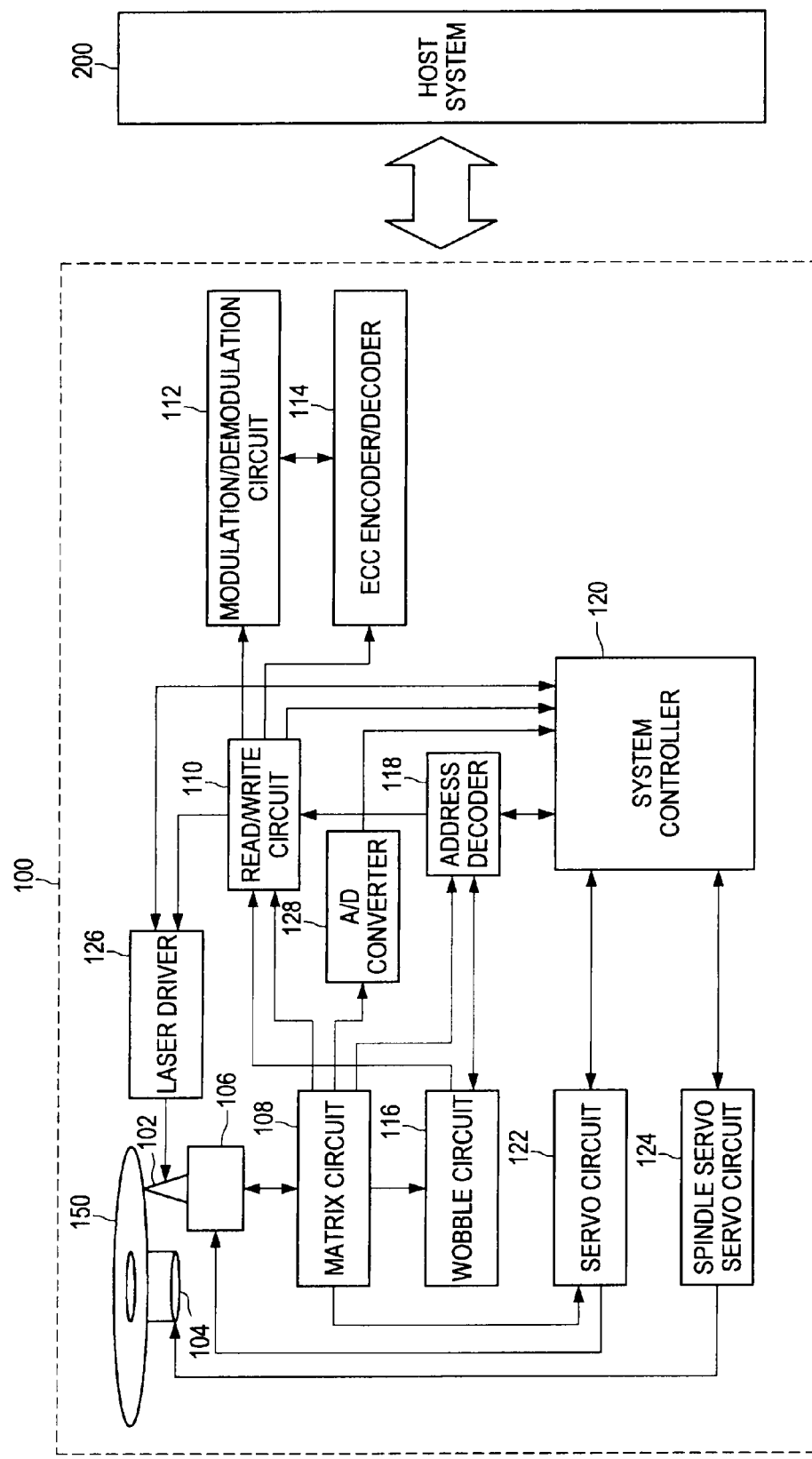
FIG. 1 is a block diagram that schematically shows a configuration of a recording and playback device that serves as a control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the explanation will be in the order shown below.
1. Configuration of recording and playback device
2. Laser output control during recording
3. Details of laser output control during recording
4. Use example
1. Configuration of Recording and Playback Device First, a recording and playback device that serves as a control device according to an embodiment of the present disclosure will be explained. FIG. 1 is a block diagram that schematically shows a configuration of the recording and playback device that serves as the control device according to the present embodiment. A recording and playback device 100 that serves as the embodiment that is shown in FIG. 1 is configured such that it can record and play back a Blu-ray Disc (BD; registered trademark) as an optical disk recording medium. Note that the term "optical disk recording medium" denotes any recording medium, such as a Compact Disc (CD), a Mini-Disc (MD), a Digital Versatile Disc (DVD), or the like, that is read by shining a laser beam onto a circular disk in which a thin metal plate is protected by plastic, a signal being read based on changes in the reflected beam.

In FIG. 1, an optical disk recording medium (hereinafter simply called the disk) 150 is a recordable type of disk (a writeable disk). In this case, a wobbling (meandering) groove is formed in a spiral shape from the inner circumference to the outer circumference of the disk 150, and this groove serves as a track (a recording track). Address information and the like that serve as what is called ADIP information are embedded as the wobbling of the groove.

The disk 150 is placed on a turntable that is not shown in the drawings and is rotationally driven at a constant linear velocity (CLV) by a spindle motor (SPM) 104 during recording and playback operations.

Reading of the ADIP information that is embedded as the wobbling of the groove track in the disk 150 is performed by an optical pickup (an optical head) 102.

During recording, user data are also recorded as marks in the track by the optical pickup 102, and during playback, reading of the data that have been recorded as marks is performed by the optical pickup 102. The optical pickup 102 is an example of a recording portion and a reading portion of the present disclosure.

Within the optical pickup 102, a optical system is formed that includes a laser diode that serves as a laser beam source, a photo-detector for detecting the reflected beam, and an objective lens that serves as an output end for the laser beam. The optical system shines the laser beam through the objective lens onto the recording surface of the disk 150 and guides the reflected beam to the photo-detector.

The entire optical pickup 102 can be moved in the radial direction of the disk 150 by a sled mechanism 106 that is shown in FIG. 1.

In the optical pickup 102, reflected beam information that has been detected by the photo-detector is converted into an electrical signal according to the amount of the received light and is supplied to a matrix circuit 108.

The matrix circuit 108 is provided with a current-voltage conversion circuit, a match computation/amplification circuit, and the like. The current-voltage conversion circuit takes output currents from a plurality of light-receiving elements that serve as the photo-detector and converts them into voltages. The matrix circuit 108 generates necessary signals by performing matrix computation processing.

For example, the matrix circuit 108 generates a high-frequency signal (a playback data signal or radio frequency (RF) signal) that corresponds to playback data, a focus error signal for servo control, a tracking error signal, and the like.

The matrix circuit 108 also generates a push-pull signal as a signal that pertains to the wobbling in the groove, that is, a signal that detects the wobbling (a wobble amplitude).

The playback data signal that is output from the matrix circuit 108 is supplied to a read/write (R/W) circuit 110. The playback data signal is also split and supplied to a system controller 120 through an A/D converter 128.

The focus error signal and the tracking error signal that are output from the matrix circuit 108 are supplied to a servo circuit 122, and the push-pull signal is supplied to a wobble circuit 116.

The read/write circuit 110 performs binarization processing of the playback data signal (the RF signal), playback clock generation processing using a PLL, and the like, producing a binary data string for the signal that is recorded on the disk 150. The binary data string is supplied to a modulation/demodulation circuit 112.

Figure 2:
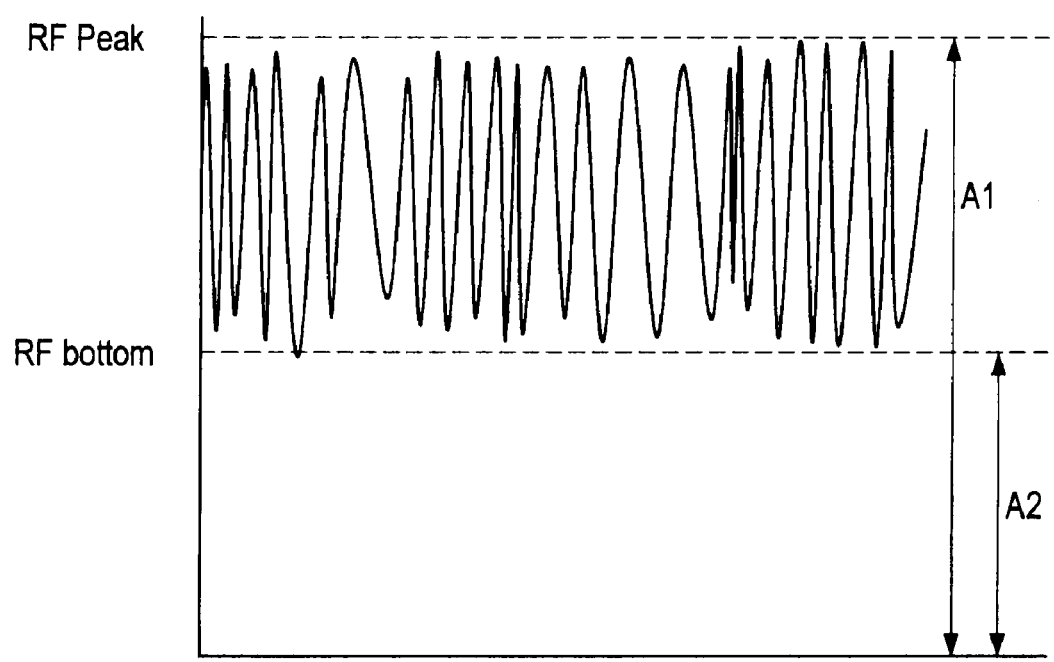
FIG. 2 is an explanatory figure for explaining an example of a playback data signal (a radio frequency signal) that is supplied to a read/write circuit in FIG. 1.

FIG. 2 is an explanatory figure for explaining an example of the playback data signal (the RF signal) that is supplied to the read/write circuit 110 in FIG. 1.

As shown in FIG. 2, the read/write circuit 110 selects values A1, A2 from the playback data signal (the RF signal) and computes a β value using Equation 1 below. The read/write circuit 110 also supplies the computed β value to the system controller 120. The system controller 120 performs laser output control during recording by using the supplied β value as a control parameter for the laser output control. Details of the laser output control during recording will be described later. Note that an explanation of the method of selecting the values A1, A2 will be omitted. The read/write circuit 110 is an example of a control parameter computation portion of the present disclosure.

$$\beta = (A1 - A2)/(A1 + A2) \qquad \text{Equation 1}$$

Returning to FIG. 1, the modulation/demodulation circuit 112 is provided with a function as a decoder during playback and a function as an encoder during recording. The modulation/demodulation circuit 112 performs, as decoding processing during playback, run length limited code demodulation processing based on the playback clock.

An ECC encoder/decoder 114 performs ECC encoding processing that appends an error correction code during recording and ECC decoding processing that performs error correction during playback. During playback, the ECC encoder/decoder 114 takes the data that have been demodulated by the modulation/demodulation circuit 112 and stores them in an internal memory (not shown in the drawings), then produces the playback data by performing error detection/correction processing and processing such as de-interleaving and the like.

The data that have been decoded into the playback data by the ECC encoder/decoder 114 are read based on a command from the system controller 120 and are transmitted to a host system 200.

The push-pull signal that is generated by the matrix circuit 108 as a signal that pertains to the wobbling in the groove is processed by the wobble circuit 116. The push-pull signal that serves as the ADIP information is demodulated by the wobble circuit 116 into a data stream that expresses an ADIP address.

A address decoder 118 produces an address value by performing decoding of the data that are supplied to it and supplies the decoded data to the system controller 120. The address decoder 118 also generates a clock by performing PLL processing using a wobble signal that has been supplied by the wobble circuit 116, then supplies an encoded clock to various portions during recording, for example.

During recording, recording data are transmitted from the host system 200, but the recording data are buffered by being sent to a memory (not shown in the drawings) in the ECC encoder/decoder 114. In this case, the ECC encoder/decoder 114 performs encoding processing that adds the error correction code to the buffered recording data, as well as adding interleaving, sub-coding, and the like.

Specified run length limited encoding processing (modulation processing), such as RLL (1-7) PP processing or the like, for example, is performed on the ECC encoded data in the modulation/demodulation circuit 112, and the data are then supplied to the read/write circuit 110.

During recording, the clock that has been generated from the wobble signal as described above is used as an encoding clock that serves as a reference clock for the encoding processes.

The recording data that are generated by the encoding processing are subjected to recording compensation processing by the read/write circuit 110, during which the optimum laser power is fine-tuned in relation to the recording layer characteristics, the shape of the laser beam spot, the linear recording speed, and the like, a laser drive pulse waveform is modified, and the like. Then the recording data are sent to a laser driver 126 in the form of a laser drive pulse.

In the laser driver 126, the supplied laser drive pulse serves as a laser drive signal, and a laser emission operation is performed by applying the laser drive signal to the laser diode. This causes marks to be formed in the disk 150 that correspond to the recording data. In other words, data recording is performed.

Note that the laser driver 126 is provided with what is called an Auto Power Control (APC) circuit that monitors the laser output power, using a detector (not shown in the drawings) that is provided inside the optical pickup 102 for monitoring the laser power, and performs control such that the laser output is kept constant, irrespective of the temperature and the like. The laser driver 126 is an example of an output control portion of the present disclosure.

Target values Pw (in milliwatts) for the laser output during recording and during playback (recording laser power and playback laser power) are set by the system controller 120, and the laser driver 126 performs control such that the laser output levels during recording and during playback conform to the respective target values.

For each disk manufacturer (MediaID), the system controller 120 stores, in advance, a target β value at which optimal recording can be done. The system controller 120 then controls the laser output target value Pw such that the supplied β value approaches the target β value. The details will be described later. The system controller 120 is an example of a differential computation portion, a determination portion, an output value computation portion, a storage portion, and a selecting portion of the present disclosure.

The servo circuit 122 performs servo operations by generating various types of servo drive signals for focusing, tracking, and operating the sled mechanism 106, based on the focus error signal and the tracking error signal from the matrix circuit 108.

In response to a track jumping command from the system controller 120, the servo circuit 122 performs a track jumping operation by turning off a tracking servo loop and outputting a jump track signal.

The servo circuit 122 also drives the sled mechanism 106 by generating a sled drive signal based on a sled error signal that is produced as a low-pass component of the tracking error signal, as well as on access control and the like by the system controller 120. The sled mechanism 106 includes a main shaft that holds the optical pickup 102, a sled motor, and a mechanism that is made up of transmission gears and the like. In response to the sled drive signal, the sled mechanism 106 drives the sled motor such that a required sliding movement of the optical pickup 102 is performed.

In response to a command from the system controller 120, the servo circuit 122 imparts a focus bias to a focus servo loop.

A spindle servo circuit 124 performs control that rotates the spindle motor 104 at a constant linear velocity. The spindle servo circuit 124 generates a spindle error signal by acquiring, as current revolution speed information for the spindle motor 104, the clock that was generated in relation to the wobble signal by the PLL processing, then comparing the revolution speed information to specified CLV reference velocity information.

During data playback as well, the playback clock that is generated by the PLL in the read/write circuit 110 (the clock that serves as the reference for the decoding processing) becomes the current revolution speed information for the spindle motor 104, so the spindle error signal can be generated by comparing the revolution speed information to the specified CLV reference velocity information. The spindle servo circuit 124 drives the spindle motor 104 at a constant linear velocity by outputting a spindle drive signal that it has generated in accordance with the spindle error signal.

The spindle servo circuit 124 also performs operations of the spindle motor 104 such as starting, stopping, accelerating, decelerating, and the like by generating spindle drive signals in accordance with a spindle kicking/braking control signal from the system controller 120.

Overall control of the recording and playback device 100, including the servo system and the recording and playback systems described above, is performed by the system controller 120, which is configured from a microcomputer.

The system controller 120 performs various types of processing in response to commands from the host system 200. For example, when a write command is output from the host system 200, the system controller 120 performs seek operation control using an address that is specified by the command as a target address. Specifically, the system controller 120 performs an access operation by the optical pickup 102 by sending a command to the servo circuit 122, using the address that is specified by the command as the target address. In conjunction with that, the system controller 120 causes the ECC encoder/decoder 114 and the modulation/demodulation circuit 112 to perform the previously described encoding processing on data that have been transmitted from the host system 200 (for example, video data, audio data, and the like, in various types of formats such as MPEG2 and the like). The Tsc120 also causes recording to be done on the disk 150 by supplying the laser drive pulse from the read/write circuit 110 to the laser driver 126.

In a case where, for example, a read command has been supplied from the host system 200 that requests data that is recorded on the disk 150 to be transmitted, first the system controller 120 performs the seek operation control using the address that is specified by the command as the target address. Then the system controller 120 performs control that is necessary in order to transmit data in a data interval that is specified by the command to the host system 200. Specifically, the system controller 120 reads the data from the disk 150, causes the read/write circuit 110, the modulation/demodulation circuit 112, and the ECC encoder/decoder 114 to perform decoding, buffering, and the like, and transmits the requested data.

Note that during data recording, the system controller 120 performs control of the access and recording operations using the ADIP information that is detected by the wobble circuit 116 and the address decoder 118.

Note that in the example in FIG. 1, the recording and playback device 100 is connected to the host system 200, but the recording and playback device according to the present disclosure may also be connected to a personal computer or the like, for example. On the other hand, the recording and playback device may also be unconnected to any other device. In that case, a configuration that is different from the one in FIG. 1 may be used, with an operation portion, a display portion, and an interface for data input and output being provided. In other words, a terminal portion may also be configured that inputs and outputs various types of data, as well as performing recording and playback, in response to a user operation.

2. Laser Output Control During Recording

Figure 3:
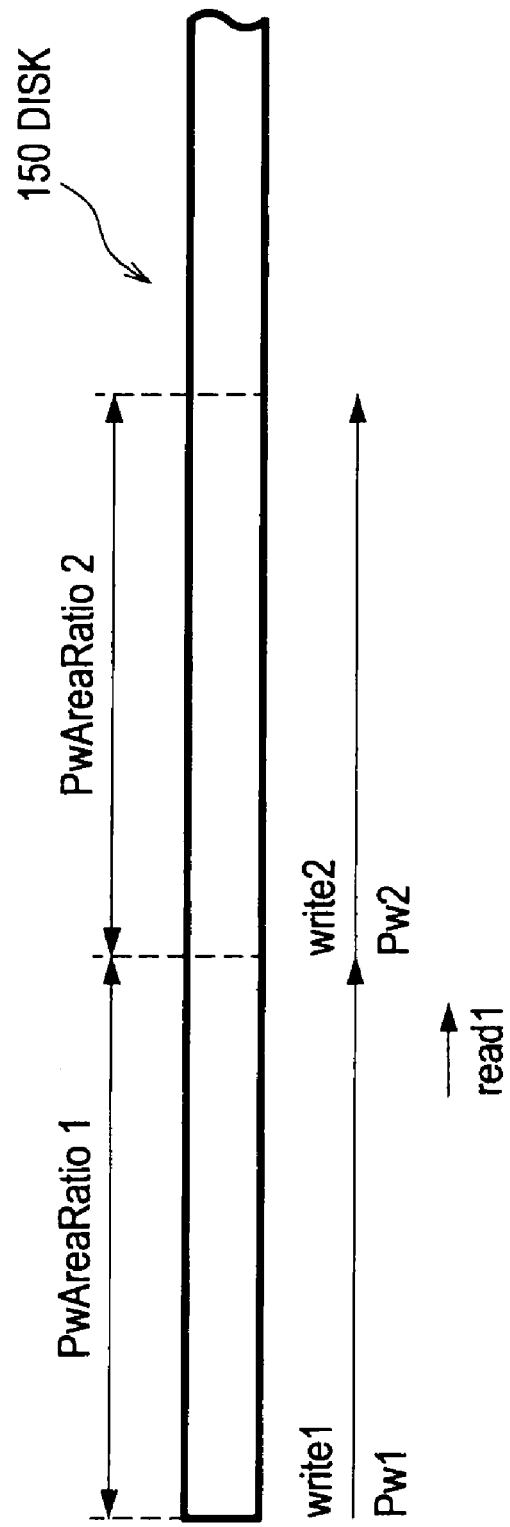
FIG. 3 is an explanatory figure for explaining laser output control that is performed during recording by the recording and playback device in FIG. 1.

Next, the laser output control that the recording and playback device 100 in FIG. 1 performs during recording will be explained. FIG. 3 is an explanatory figure for explaining the laser output control that is performed during recording by the recording and playback device 100 in FIG. 1. The recording and playback device 100 uses the previously described β value as the control parameter for controlling the target value Pw (in milliwatts) of the laser output during recording.

In FIG. 3, first, before recording the data on the disk 150, the recording and playback device 100 performs Optimum Power Calibration (OPC) and sets an initial Pw for the laser output and a βSense that indicates the sensitivity of β to the laser output Pw. Note that βSense is computed using Equation 2 below. Specifically, βSense indicates an amount of change (sensitivity) in β in relation to an amount of change in Pw.

$$\beta Sense = \Delta \beta / \Delta Pw \qquad \text{Equation 2}$$

Figure 4:
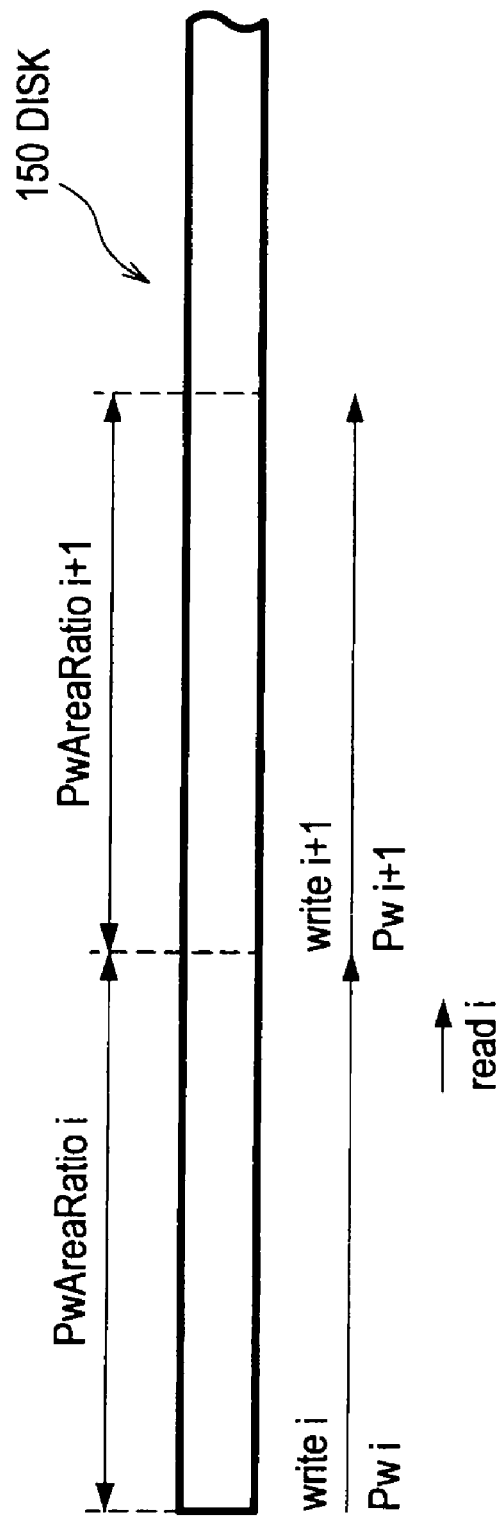
FIG. 4 is an explanatory figure for continuing the explanation of the laser output control that is performed during recording by the recording and playback device in FIG. 1.

The recording and playback device 100 starts recording using the initial Pw as a Pw 1 and performs a write 1. After the write 1 is completed, the recording and playback device 100 acquires the previously described RF signal by performing a read 1 that reads back the area that was recorded by the write 1. Then the recording and playback device 100 computes the β value based on the RF signal and computes a differential Δβ in relation to the target β value. The recording and playback device 100 determines whether the differential Δβ between the β value and the target β value is within a range of a dead band, and if the differential Δβ is within the range of the dead band, the recording and playback device 100 computes a Pw 2 using Equations 3 and 4 below. Then the recording and playback device 100 starts recording using the Pw 2 and performs a write 2. FIG. 4 is an explanatory figure for continuing the explanation of the laser output control during recording that is performed by the recording and playback device 100 in FIG. 1.

$$Pw\text{AreaRatio2} = Pw\text{AreaRatio1} + (\Delta\beta \times \text{gain} \times (Pw\text{Area-Ratio1} + 500)/Pw1 \times \beta Sense \times 1000) \qquad \text{Equation 3}$$

$$Pw2 = \text{Initial}Pw \times ((Pw\text{AreaRatio2} + 500)/1000) \qquad \text{Equation 4}$$

In other words, Pw 2 is computed using Equation 5 below.

$$Pw2 = f(\Delta\beta, Pw1, PwAreaRatio1)$$ Equation 5

Here the PwAreaRatio is 500 when the initial Pw is used. The gain is a value that is greater than zero and not greater than one.

Incidentally, the disk that is the object of the control by the recording and playback device 100 may have unevenness in its sensitivity due to factors such as the manufacturer, the stamper, the material, the manufacturing lot, and the like. Some disks have great unevenness in their sensitivity and other disks have very little. Accordingly, in the present embodiment, laser output control that is not affected by unevenness in the disk's sensitivity, by variability in external factors when the β value is acquired, or the like is achieved by selecting a dead band and a gain that are appropriate for the disk that is being used.

FIG. 5 is an explanatory figure for explaining an example of an item that is stored by the recording and playback device in FIG. 1. Note that FIG. 5 will be used as an example for explaining a case in which the recording and playback device 100 is storing four items, but the number of items that are stored in the recording and playback device 100 is not limited to four, and the precision of the laser output control can be improved to the extent that the number of the items increases.

The β value is acquired by using combinations of the individual items, the dead band, and the gain to allocate values for the dead band and the gain to areas on the disk in advance, then performing test recording. Then, as shown by Equation 6 below, a DBSum is computed by raising the differential Δβ between the computed β value and the target β value to the second power and adding the result N times, then dividing by N. The dead band and the gain for which the DBSum is the lowest are selected.

$$DBSum = \sqrt{\frac{\sum_{i=0}^{N-1} |\Delta\beta i|^2}{N}}$$ Equation 6

Figure 8:
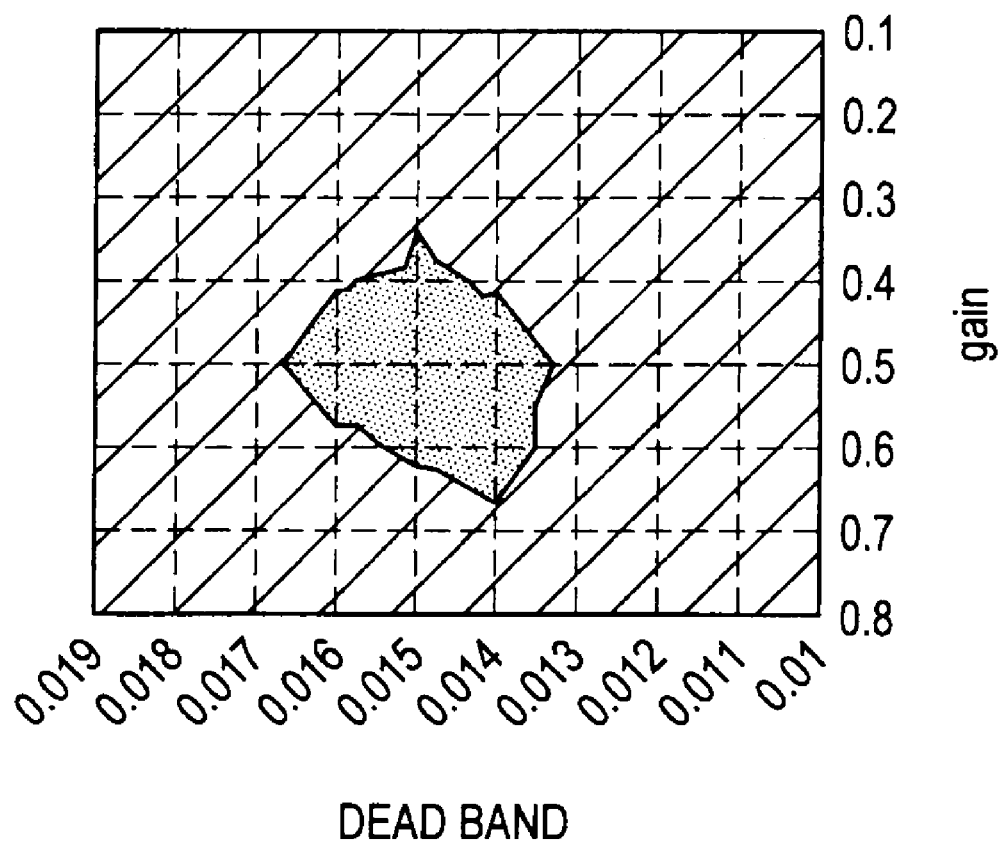
FIG. 8 is an explanatory figure for explaining examples of the dead band, the gain, and the DBSum.

FIGS. 7 and 8 are explanatory figures for explaining examples of the dead band, the gain, and the DBSum. In the examples that are shown in FIGS. 7 and 8, 0.015 is selected as the dead band, and 0.5 is selected as the gain. Various combinations exist for the combination of the dead band and the gain, depending on the individual disk, so it is preferable to establish a plurality of the items in the system controller 120 in advance, as shown in FIG. 5. Note that the items may be established by performing the test recording in advance at the design stage, and they may also be established using a Power Calibration Area on the disk during the initial OPC.

3. Details of Laser Output Control During Recording

Figure 6:
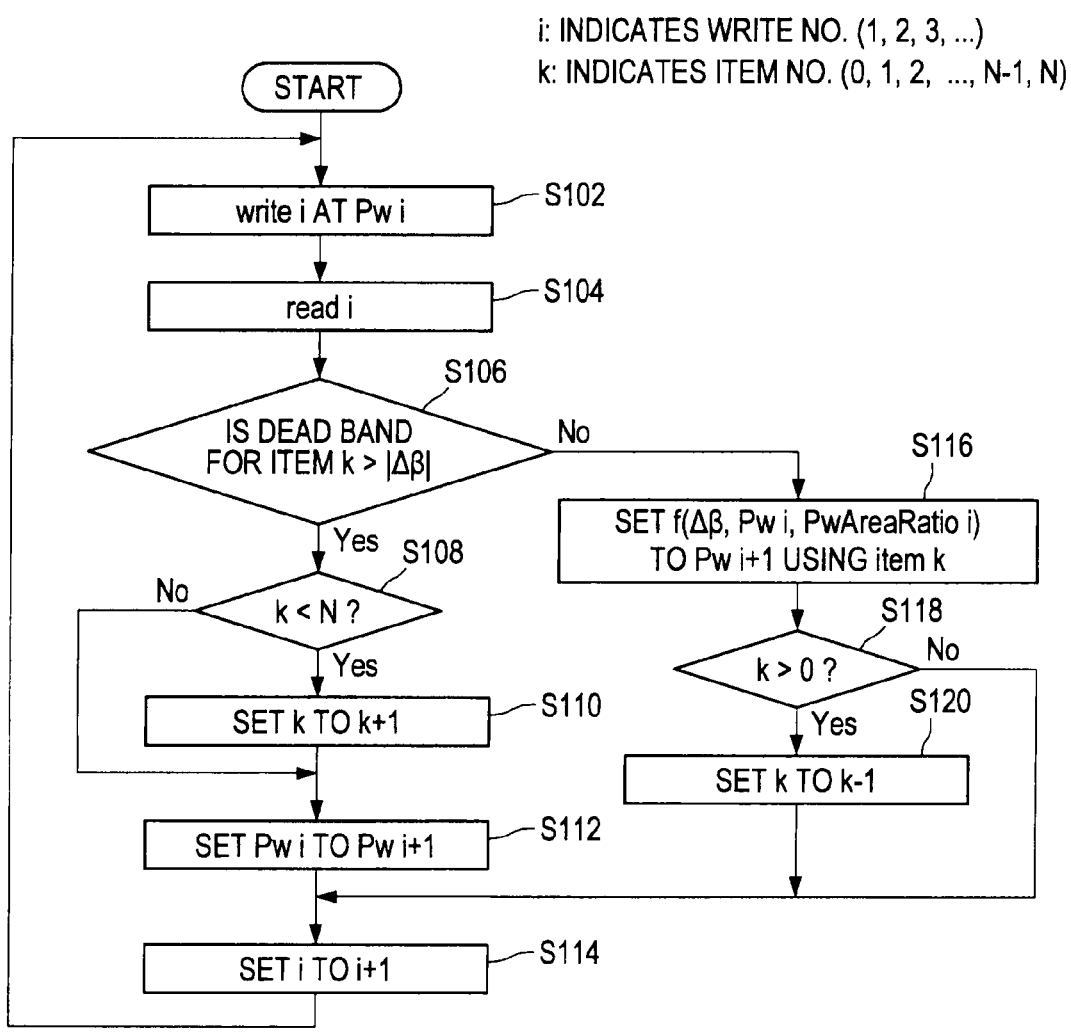
FIG. 6 is a flowchart of the laser output control that the recording and playback device in FIG. 1 performs during recording.

Next, the laser output control that the recording and playback device 100 in FIG. 1 performs during recording will be explained in detail. FIG. 6 is a flowchart of the laser output control that the recording and playback device 100 in FIG. 1 performs during recording. The recording and playback device 100 performs the laser output control according to whether or not the differential Δβ between the β value and the target β value is within the range of the dead band. That is, the recording and playback device 100 determines whether or not to adjust the laser output value Pw, and in a case where it does adjust Pw, it uses the gain to compute the laser output value. Specifically, in a case where the differential Δβ between the β value and the target β value is within the range of the dead band, the recording and playback device 100 does not adjust Pw, and in a case where the differential Δβ is not within the range of the dead band, the recording and playback device 100 does adjust Pw. Note that the control flowchart in FIG. 6 shows only the operation during recording, and descriptions of the operations for starting recording and terminating recording have been omitted.

In FIG. 6, first, the recording and playback device 100 starts recording using the initial Pw as a Pw i and performs a write i (Step S102).

Next, the recording and playback device 100 acquires the RF signal by reading back, as a readi, the area that was recorded by the write i (step S104).

Next, the recording and playback device 100 computes the β value based on the RF signal and computes the differential Δβ in relation to the target β value. Then the recording and playback device 100 determines whether or not the computed differential Δβ is within the range of the dead band for an item k. Note that the recording and playback device 100 stores a number N of the items, and "item k" indicates the k-th item.

If the result of the determination at Step S106 is that the differential Δβ is within the range of the dead band for the item k (YES at Step S106), the recording and playback device 100 determines whether or not the value of k for the item k is less than the value of N (Step S108).

If the result of the determination at Step S108 is that the value of k for the item k is not less than the value of N, that is, that the value of k is equal to the value of N (NO at Step S108), the processing advances to Step S112.

If the result of the determination at Step S108 is that the value of k for the item k is less than the value of N (YES at Step S108), the recording and playback device 100 adds 1 to the value of k (Step S110), and the processing advances to Step S112. Specifically, the recording and playback device 100 compares the item that has just been used to the item that will be used next, as shown in FIG. 5, and selects an item for which the dead band is narrower and the value of the gain is less.

At Step S112, the recording and playback device 100 takes the Pw i for the immediately preceding write and sets it to Pw i+1 for the next write (Step S112). In other words, the recording and playback device 100 proceeds to the next write without adjusting the laser output.

Next, the recording and playback device 100 adds 1 to the value of i (Step S114), and the processing returns to Step S102.

On the other hand, if the result of the determination at Step S106 is that the differential Δβ is not within the range of the dead band for the item k (NO at Step S106), the recording and playback device 100 uses the item k, that is, the gain for the item k, to compute the Pw i+1 for the next write (Step S116). That is, the recording and playback device 100 uses the Equations 3 and 4 above to compute the laser output Pw i+1 for the next write.

Next, the recording and playback device 100 determines whether or not the value of k for the item k is greater than zero (Step S118).

If the result of the determination at Step S118 is that the value of k for the item k is not greater than zero, that is, is the value of k is zero (NO at Step S118), the processing advances to Step S114.

If the result of the determination at Step S118 is that the value of k for the item k is greater than zero (YES at Step S118), the recording and playback device 100 subtracts 1 from the value of k (Step S120), and the processing advances to Step S114. Specifically, the recording and playback device 100 compares the item that has just been used to the item that will be used next, as shown in FIG. 5, and selects an item for which the dead band is wider and the value of the gain is greater.

According to the control in FIG. 6, the recording and playback device 100 stores the plurality of combinations of dead bands and gains, and if the differential Δβ is within the range of the dead band for the current item, the recording and playback device 100 compares the item that has just been used to the item that will be used next and selects an item for which the dead band is narrower and the value of the gain is less. This makes it possible for the β value that serves as the control parameter to reliably converge toward the target β value, such that the recording performance during recording on the disk can be improved.

Furthermore, according to the control in FIG. 6, if the differential Δβ is not within the range of the dead band for the current item, the recording and playback device 100 uses the gain to compute the laser output value and adjusts the laser output, then compares the item that has just been used to the item that will be used next and selects an item for which the dead band is wider and the value of the gain is greater. This makes it possible for the β value that serves as the control parameter to efficiently converge toward the target β value.

4. Use Example

The control in the present embodiment that is described above detects an amount of deviation from a target for a positioning mechanism or the like that is driven by a motor, and it can be used for correcting the deviation such that a next target can be reached.

In this case, a target position is defined as Target L (meters), a position after moving is defined as L (meters), an amount of deviation from the target position is defined as ΔL (meters), an amount of electric power for the motor is defined as P (watts), and a sensitivity of L in relation to the electric power P is defined as LSense (meters/watt). The dead band and the gain can be selected by using Equation 6 to compute a DLSum. Storing a plurality of Items makes it possible to select Items that are appropriate for a variety of conditions, such that precision can be improved when the deviation is corrected.

An object of the present disclosure is to provide, to one of a system and a device, a storage medium that stores program code for software that implements the functions of the present embodiment that is described above. The object can be achieved by having a computer (a CPU, and MPU, or the like) in either one of the system and the device read the program code that is stored in the storage medium and execute the program.

In this case, the program code that is read from the storage medium implements the functions of the present embodiment that is described above, and the storage medium in which the program code and a kernel program code are stored embodies the present disclosure.

One of an optical disk, such as a floppy disk (registered trademark), a hard disk, a magneto optical disk, a CD-ROM, a CD-R, a CD-RW, a DVD-ROM, a DVD-RAM, a DVD-RW, a DVD+RW, or the like, a magnetic tape, a non-volatile memory card, a ROM, and the like can be used as the storage medium for supplying the program code. The program code may also be downloaded through a network.

The functions of the present embodiment that is described above may be implemented not only by the executing of the program code that the computer has read. Cases may also exist in which an operating system (OS) or the like that is running on the computer performs one of all and a part of the actual processing that is based on commands in the program code, and the functions of the present embodiment that is described above may be implemented by that processing.

Furthermore, the program code that has been read from the storage medium may also be written to a memory that is provided in one of a function expansion board that has been inserted into the computer and a function expansion unit that has been connected to the computer, after which a CPU or the like that is provided in the one of the function expansion board and the function expansion unit may perform one of all and a part of the actual processing that is based on commands in the program code, and the functions of the present embodiment that is described above may be implemented by that processing.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-149582 filed in the Japan Patent Office on 30 Jun. 2010, the entire content of which is hereby incorporated by reference.

What is claimed is:

1. A control device comprising:
   a recording portion that records data on a disk by shining a laser beam onto a recording surface of the disk;
   a reading portion that reads the data that the recording portion has recorded on the disk;
   a control parameter computation portion that computes a control parameter based on a signal that is generated by the reading of the data by the reading portion;
   a differential computation portion that computes a differential between the control parameter that the control parameter computation portion has computed and a value that is set in advance for the disk;
   a determination portion that determines whether the differential that the differential computation portion has computed is within a range of a dead band;
   an output value computation portion that, in a case where the result of the determination by the determination portion is that the differential is not within the range of the dead band, computes, using a gain that is associated with the dead band, an output value for the laser beam that the recording portion will shine next onto the recording surface of the disk;
   an output control portion that, based on the laser beam output value that the output value computation portion has computed, controls the laser beam that the recording portion will shine next onto the recording surface of the disk;
   a storage portion that stores a plurality of combinations of the dead band and the gain; and
   a selecting portion that selects, from among the plurality of the combinations of the dead band and the gain, one of the combinations of the dead band and the gain that the determination portion and the output value computation portion will use.

2. The control device according to claim 1,
   wherein the selecting portion, in a case where the result of the determination by the determination portion is that the differential is within the range of the dead band, selects, as the combination of the dead band and the gain that the determination portion and the output value computation portion will use, one of the combinations of the dead band and the gain in which the range of the dead band is narrower than the range of the current dead band.

3. The control device according to claim 2,
wherein the value of the gain that the selecting portion has selected and that the determination portion and the output value computation portion will use next is less than the value of the immediately preceding gain that the determination portion and the output value computation portion used.

4. The control device according to claim 1,
wherein the selecting portion, in a case where the result of the determination by the determination portion is that the differential is not within the range of the dead band, selects, as the combination of the dead band and the gain that the determination portion and the output value computation portion will use, one of the combinations of the dead band and the gain in which the range of the dead band is wider than the range of the current dead band.

5. The control device according to claim 4,
wherein the value of the gain that the selecting portion has selected and that the determination portion and the output value computation portion will use next is greater than the value of the immediately preceding gain that the determination portion and the output value computation portion used.

6. A control method comprising:
recording data on a disk by shining a laser beam onto a recording surface of the disk;
reading the data that have been recorded on the disk;
computing a control parameter based on a signal that is generated by the reading of the data;
computing a differential between the computed control parameter and a value that is set in advance for the disk;
determining whether the computed differential is within a range of a dead band;
computing, using a gain that is associated with the dead band, an output value for the laser beam that will be shone next onto the recording surface of the disk, in a case where it has been determined that the differential is not within the range of the dead band;
controlling the laser beam that will be shone next onto the recording surface of the disk, based on the computed laser beam output value;
storing a plurality of combinations of the dead band and the gain; and
selecting, from among the stored plurality of the combinations of the dead band and the gain, one of the combinations of the dead band and the gain that will be used for determining whether the computed differential is within the range of the dead band and for computing the output value for the laser beam.

7. A non-transitory readable recording medium having stored thereon a control program that causes a computer to function as
a recording portion that records data on a disk by shining a laser beam onto a recording surface of the disk;
a reading portion that reads the data that the recording portion has recorded on the disk;
a control parameter computation portion that computes a control parameter based on a signal that is generated by the reading of the data by the reading portion;
a differential computation portion that computes a differential between the control parameter that the control parameter computation portion has computed and a value that is set in advance for the disk;
a determination portion that determines whether the differential that the differential computation portion has computed is within a range of a dead band;
an output value computation portion that, in a case where the result of the determination by the determination portion is that the differential is not within the range of the dead band, computes, using a gain that is associated with the dead band, an output value for the laser beam that the recording portion will shine next onto the recording surface of the disk;
an output control portion that, based on the laser beam output value that the output value computation portion has computed, controls the laser beam that the recording portion will shine next onto the recording surface of the disk;
a storage portion that stores a plurality of combinations of the dead band and the gain; and
a selecting portion that selects, from among the plurality of the combinations of the dead band and the gain, one of the combinations of the dead band and the gain that the determination portion and the output value computation portion will use.

* * * * *